United States Patent [19]

Barzee

[11] 4,408,860
[45] Oct. 11, 1983

[54] APPARATUS FOR A CAMERA MOUNT

[75] Inventor: Verl N. Barzee, Sunnyvale, Calif.

[73] Assignee: Ampex Corporation, Redwood City, Calif.

[21] Appl. No.: 364,727

[22] Filed: Apr. 2, 1982

[51] Int. Cl.³ ............................................ G03B 17/56
[52] U.S. Cl. ..................................... 354/293; 352/243
[58] Field of Search ........................ 354/293; 358/229; 352/243; 248/648, 680, 681

[56] References Cited

U.S. PATENT DOCUMENTS 3,589,260  6/1971  Ferra .................................. 354/293

FOREIGN PATENT DOCUMENTS 2808788  9/1979  Fed. Rep. of Germany ...... 354/293

Primary Examiner—John Gonzales
Attorney, Agent, or Firm—Joel D. Talcott; Charles M. Carman, Jr.

[57] ABSTRACT

In a camera mount of the type in which a front plate is attached to a lens which in turn is attached to the front of the camera and a base plate extends from the front plate beneath the camera to secure the camera bottom and to exert a predetermined supporting force upwardly on the camera to counter the moment of the camera on the lens, an interlock is provided to control the operation of the securing means to sequentially follow the operation of the supporting means in both securing and releasing modes.

7 Claims, 7 Drawing Figures

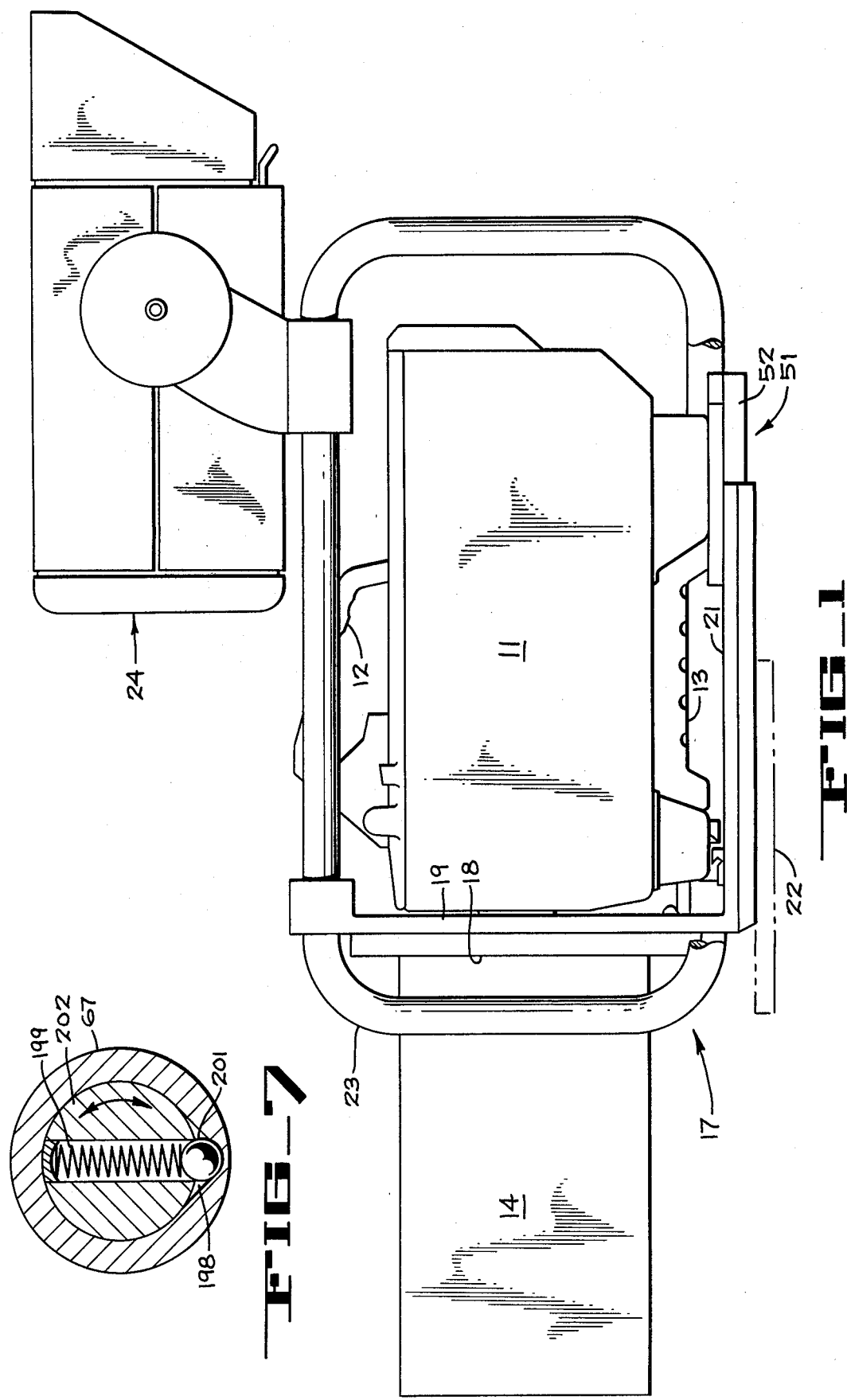

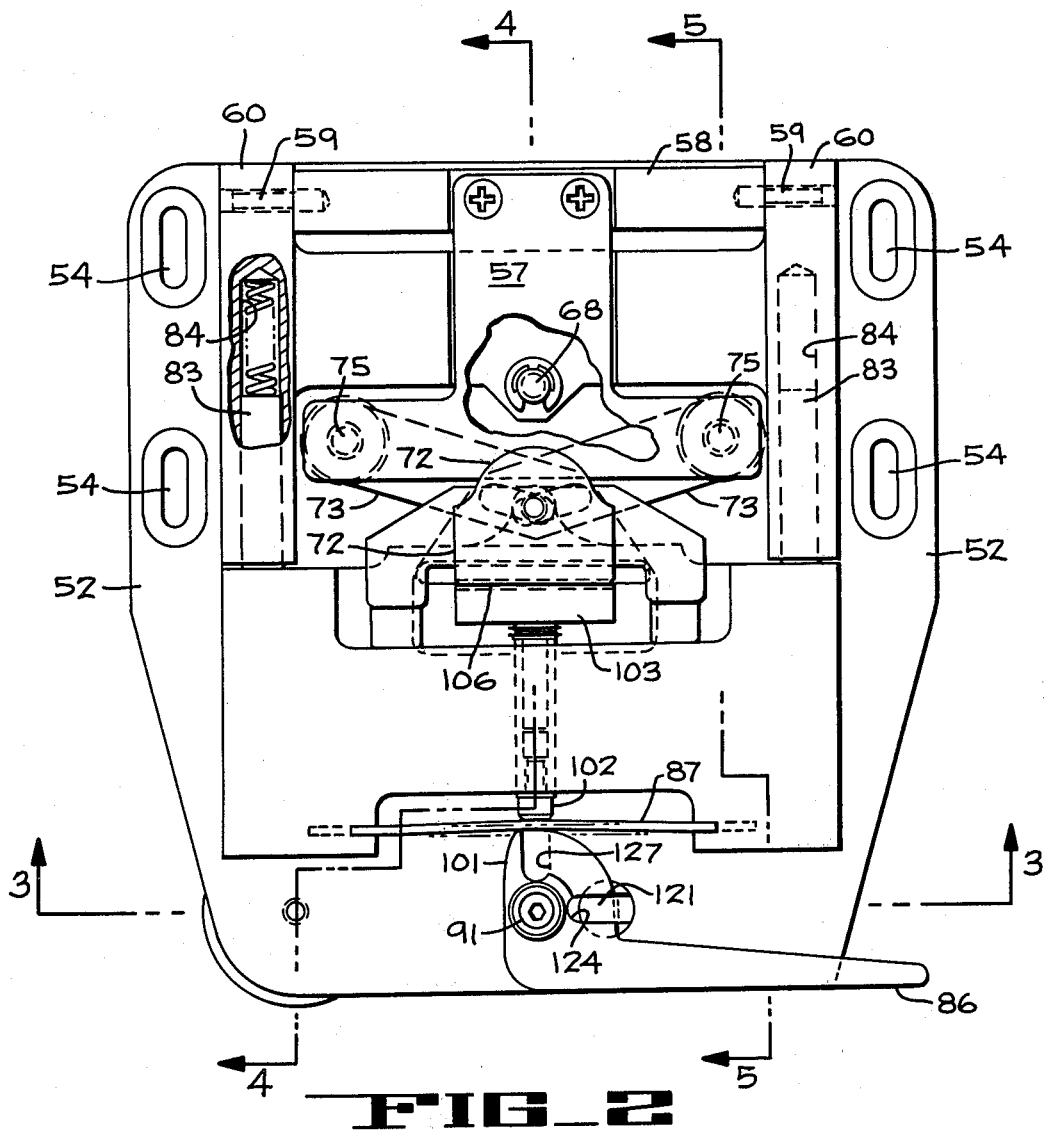
FIG_2
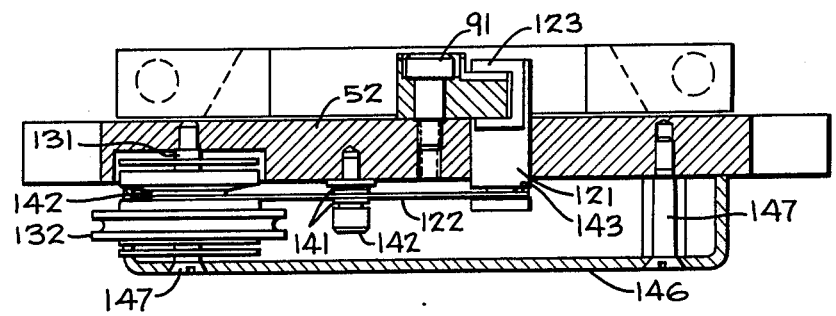
FIG_3

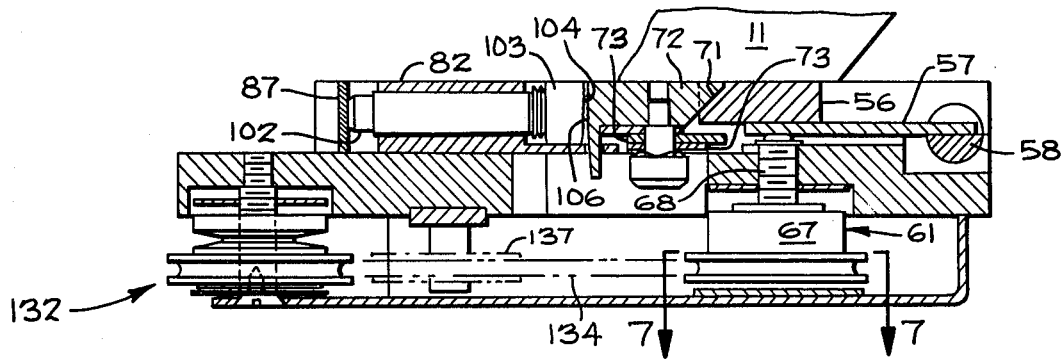
FIG_4
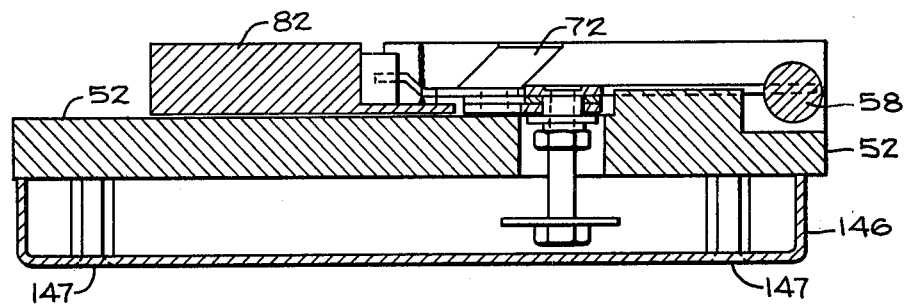
FIG_5
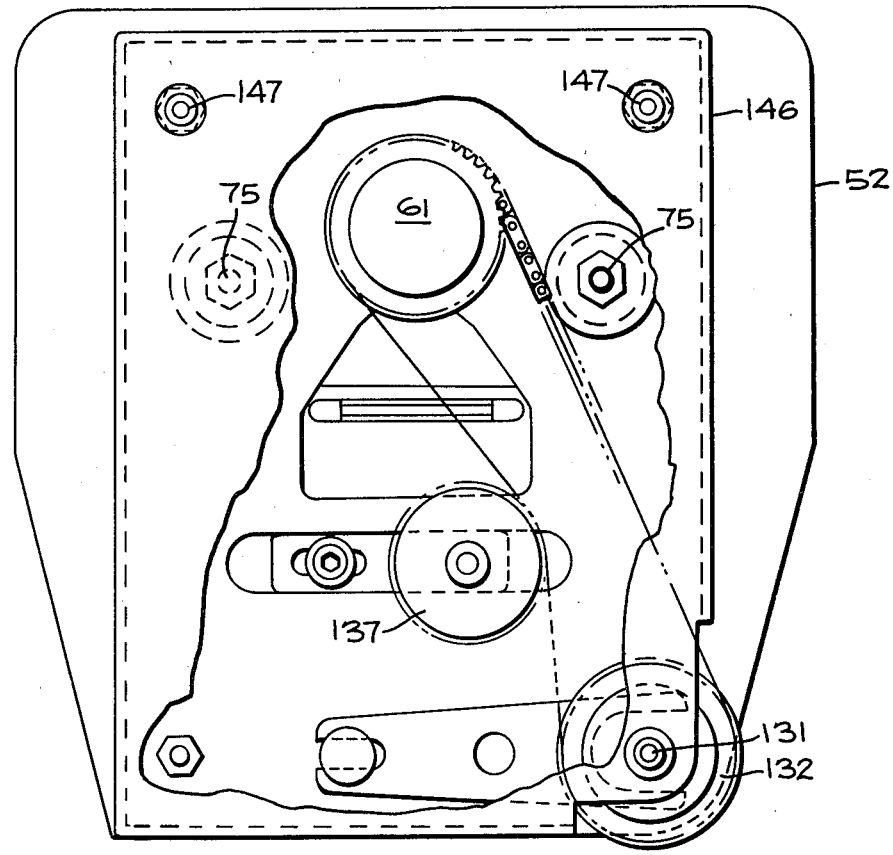
FIG_6

APPARATUS FOR A CAMERA MOUNT

This invention relates to camera mounts, and particularly to such mounts having provisions for front-mounting the camera to a lens without imposing flexing moments on the front-mount thereof.

In copending U.S. patent application Ser. No. 405,988 filed Aug. 6, 1982, as a continuation of Ser. No. 313,069, filed Oct. 19, 1981, now abandoned, and assigned to the assignee of the present application, there is disclosed a studio mount for a field-operable television camera, having provision for front-mounting the camera to a lens in in such a way to preserve the lens-camera optical axis undistorted when heavy lenses are used. To avoid imposing flexing moments on the lens camera connection, a clamp is provided for the bottom of the camera and a torque-screw means is arranged to exert a moment on the camera bottom to precisely counter the moment otherwise exerted by the camera on the lens.

It has been found in actual use of the above described apparatus that the clamp is difficult to operate in clamping mode if the torque-screw is in the moment-exerting (screwed-in) position.

Accordingly, it is an object of this invention to ensure that the clamping means operates smoothly and easily in the clamping mode of operation.

SUMMARY OF THE INVENTION

In a camera mount of the type in which a front plate is attached to a lens which in turn is attached to the front of the camera and the base plate extends from the front plate beneath the camera to secure the camera bottom and to exert a predetermined supporting force upwardly on the camera to counter the moment of the camera on the lens, an interlock is provided to control the operation of the securing means to sequentially follow the operation of the supporting means in both securing and releasing modes.

DESCRIPTION OF THE DRAWINGS

FIG. 1 is side elevation view of a camera and mount employing the present invention;

FIG. 2 is a broken way plan view, enlarged scale, of the portion of the apparatus shown in FIG. 1;

FIG 3 is cross-section taken on the plane 3—3 of FIG. 2;

FIG. 4 is a cross-section taken on the plane 4—4 of FIG. 2;

FIG. 5 is a cross-section taken on the plane 5—5 of FIG. 2;

FIG. 6 is a broken away bottom view of the apparatus of FIG. 2; and

FIG. 7 is a cross-section taken on Plane 7—7 of FIG. 4.

DESCRIPTION OF THE PREFERRED EMBODIMENTS

Referring now to FIG. 1, there is shown a portable television camera 11 having a carrying handle 12 and shoulder saddle 13. A heavy lens assembly 14 is attached to the camera 11 by means of a coupling (not shown) and to a studio mount 17 as by means of a lens mounting plate 18, extending from the lens assembly 14 and attached to a front plate 19 of the mount 17. The remainder of the mount 17 includes a bottom plate 21 extending horizontally and rearwardly from the bottom of front plate 19, portions of a studio base or tripod attachment means 22 extending from the bottom plate, protecting and handling cage grille bars 23 attached to the front and bottom plates, and a view finder apparatus 24, attached to the bars 23.

The apparatus so far described is known in the art; and the attachment means 18 and 19, are further described in the above referenced Application Ser. No. 313,069 now U.S. Pat. No. 405,988.

To support the rearward portion of the camera, the present invention contemplates a structure 51, also shown in FIGS. 2–6, for precisely countering the vertically downward rotational moment of the camera.

Upon the rearward portion of plate 21 is secured a frame member 52, as by bolts or machine screws (not shown), which pass through openings 54 (FIG. 2) in member 52, the openings 54 being elongated in a forward-rearward direction to prevent later positional adjustment. A shoe 56 (FIG. 4) extends downwardly from camera 11 and rests upon a pressure distributing plate 57, which in turn is pivoted on a shaft 58 journalled on set-screw pins 59 between two arms 60 of the frame 52. To support the plate 57, a torque-screw 61 is threaded upwardly through frame 52 to engage the plate 57 beneath shoe 56. The torque-screw 61 has an end pressure of 18–22 pounds, described as the maximum pressure that may be supported by the upper end of the screw while the screw retains its ability to turn in the threads of the screw hole. When this pressure is exceeded, a spring 199 loaded detent ball 201 (FIG. 7) slips out of a small recess 198 in a metal bearing plate 202 which is is retained inside the screw's manually rotatable knob 67, permitting the knob to turn freely with the respect to the threaded screw body 68. It will be noted that the recess 198 is bevelled on both sides of the ball 201 so that the breakaway action, and the end-pressure of the screw, are the same in both directions of operation.

Thus to counter the moment of the camera assembly, it is merely necessary to turn the knob 67 until it begins to turn freely around the screw body 68, the end-pressure characteristic of the torque screw having been selected to precisely counter-balance that moment.

To assist in clamping the shoe member 56 to the plate 57, the shoe is formed with an upward and rearwardly opening conical recess 71, the vertical axis of which lies outside the body of the shoe, and a floating conical detent member 72 is arranged to seek and seat itself in the recess 71. The conical member 72 is mounted on a pair of leaf spring members 73, pivoted as by bolts 75 from the sides of member 57, and having a lost-motion connection with each other, permitting horizontal seeking and seating motion of member 72, while vertical seeking and seating motion of the conical detent 72 is permitted by the flexibility of spring leaves 73. For securing the member 72 there is provided a forward-rearward slider member 82, from which extend a pair of forwardly directed slider rods 83, which slide in bores 84 of member 52, the rods being spring loaded for rearward (retracting) movement, and being urged forwardly to seat the conical detent 72 as by means of a bell-crank toggle handle 86, which in closed position bears against spring leaf 87 mounted at the ends in slots in member 82. The ends of leaf 87 have a trapezoidal inclination, so as to assure retention of the leaf in its slots in member 82 when inserted from below. The handle 86 is separately mounted, being pivoted by a bolt 91 to plate 52.

To move the conical member 72 forwardly for seeking and seating the conical recess 71 of the camera, the forward end 101 of the crank 86 transmits force through the spring leaf 87 to the end of a sliding shaft 102, on the forward end of which is mounted a friction plate 103. The plate 103 has a roughened forward surface 104 for confronting and engaging a similar surface 106 formed on element 72. Thus, while the conical element 72 is moving forwardly but has not yet seated firmly in the conical recess 71, the conical element 72 has freedom for seeking and seating motion upward-downward directions and in horizontal lateral directions, all orthogonal to the forward-backward seating and retracting directions in which it is moved by the crank 86 or the springs in bores 84; but when the conical element 72 reaches its final seating position in the conical recess 71, the friction elements 103, 72 become locked in pressurized frictional engagement and cannot easily be shifted laterally with respect to one another. The shaft 102 is provided with belleville springs so as to springily apply the needed pressure to the friction elements 103, 72. The shaft 102 may be secured, e.g., magnetically to the means 87, or otherwise secured for retraction when released by the crank 86.

It will be understood that the conical element 72 will usually seat in the recess 71 so as to be engaged therewith with only tangentially, i.e., along substantially only a single generatrix of the member 72 and the single generatrix of the surface 71, for as the member 72 rises with respect to the surface 71, each portion of the element, which has a given radius of curvature, encounters portions of surface 71 of of greater and greater radius of curvature. This essentially linear contact between the two elements is useful in permitting play of the element 72 in its seeking and seating movements.

A unique improvement provided by the present invention is an interlock arranged to ensure that the torque-screw is fully engaged before the bell-crank 86 can be closed to engage cone 72.

As shown in FIGS. 2 and 3, a detent 121 is spring-loaded as by a leaf spring 122 to interpose an upper shoulder 123 into an upper recess 124 of the member 86 whenever the member 86 is closed while the torque-screw 61 is in its upper position pressurizing the plate 57 and the camera, and to move upwardly as the torque-screw 61 moves downwardly, so as to interpose a lower shoulder 126 into a lower recess 127 of the member 86 whenever the latter is opened while the torque-screw 61 is in the lower position not pressurizing the plate 57 and the camera.

Thus, the member 86 can never be closed to clamp the camera unless the torque-screw is, or has been, moved to its pressurizing position; and to ensure that this position is brought about before the camera is clamped, and not left until later, the unclamping action of the member 86 is blocked until the torque-screw is lowered so as to engage the detent shoulder 126 in recess 127 when the member 86 is opened. It will be seen, therefore, that the latching apparatus includes and controls the pressurizing means 61, 132 and the clamping means 72, 86, as by interlock means 121, 123, 124, 126, 127, to operate in a first sequence "pressurizing-then-clamping" during the latching mode, and a second sequence "depressurizing-then-unclamping" during the unlatching mode.

To coordinate the operation of the torque-screw 61 with that of the detent 121, a parallel screw post 131 is fixed on the plate 52 and a nut 132 in a form of a toothed belt drive is threaded on a post 131. This toothed wheel 132 also forms a convenient thumb-wheel for manual operation of the torque-screw, through a toothed belt 134 that drives a similar toothed wheel 136 coupled to the torque-screw 61, the belt 134 being tensioned by an adjustable tension idler 137.

To raise and lower the detent 121 inversely with the lowering and raising of the torque-screw 61, the spring leaf 122 is pivoted at the midpoint as by means of a sandwiching pair of belleville springs 141 retained by a bolt 142, and the spring 122 is provided with forked ends riding in appropriate circumferential grooves 142, 143 of the body of wheel 132 and in detent 121, respectively.

A cover housing 146 is also provided, and is retained by bolts 147 to plate 52.

What is claimed is:

1. A camera mount of the type having a front plate attched to a lens which is attached to the front of the camera, a base plate extending therefrom and beneath the camera, and a manually-operable latching apparatus including clamping means and pressurizing means mounted on the base plate for respectively securing the bottom of the camera and for exerting a predetermined supporting force upwardly on said camera to counter the moment otherwise exerted by the camera on the lens, wherein:
    said latching apparatus is adapted to control said means thereof to operate in the first sequence pressurizing-then-clamping during latching mode and the second sequence depressurizing-then-unclamping during the unlatching mode.

2. Latching apparatus as characterized in claim 1 and including:
    interlock means coupled to control said clamping means and said pressurizing means as by requiring said first sequence for latching mode and said second sequence for unlatching mode.

3. Apparatus as characterized in claim 2, in which the clamping means and the pressurizing means are each directly hand-operable, and said interlock means automatically controls the sequence of operation of the two means in each of said modes.

4. Apparatus as characterized in claim 3, wherein:
    said pressurizing means comprises a thumb operable rotating torque-screw means;
    said clamping means includes a hand-operable bell-crank member; and
    said interlock means includes a detent element operated by said torque-screw means in the retracted position thereof to be interposed in the clamping path of said bell-crank member, and to be interposed in the unclamping path of said bell-crank member when said torque-screw means is in the engaged position thereof.

5. Apparatus as characterized in claim 4, wherein said torque-screw means includes a threaded screw shaft, a rotating operating head element therefor, and spring-loaded cam-detent means coupled between said screw and head, the spring-loading of said detent means being selected to induce turning of said screw conjointly with said operating head in either direction only when the operating torque resistance of said screw to turning is within predetermined limits.

6. Apparatus as characterized in claim 5, wherein stop means are provided for said screw to limit the unscrewing range of motion thereof.

7. Apparatus as characterized in claim 6, wherein said torque screw is arranged to have the same end-pressure in both directions of operation.

* * * * *